United States Patent
Wang et al.

(10) Patent No.: US 11,492,008 B2
(45) Date of Patent: Nov. 8, 2022

(54) MODEL REFERENCE ADAPTIVE CONTROL ALGORITHM TO ADDRESS THE VEHICLE ACTUATION DYNAMICS

(71) Applicant: Baidu USA LLC, Sunnyvale, CA (US)

(72) Inventors: Yu Wang, Sunnyvale, CA (US); Qi Luo, Sunnyvale, CA (US); Shu Jiang, Sunnyvale, CA (US); Jinghao Miao, Sunnyvale, CA (US); Jiangtao Hu, Sunnyvale, CA (US); Jingao Wang, Sunnyvale, CA (US); Jinyun Zhou, Sunnyvale, CA (US); Jiaxuan Xu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 145 days.

(21) Appl. No.: 16/797,833

(22) Filed: Feb. 21, 2020

(65) Prior Publication Data

US 2021/0261160 A1    Aug. 26, 2021

(51) Int. Cl.
*B60W 60/00* (2020.01)
*B60W 10/10* (2012.01)
(Continued)

(52) U.S. Cl.
CPC ........ *B60W 60/0015* (2020.02); *B60W 10/10* (2013.01); *B60W 10/18* (2013.01); *B60W 10/20* (2013.01)

(58) Field of Classification Search
CPC .. B60W 60/0015; B60W 10/10; B60W 10/18; B60W 10/20; B60W 50/06;
(Continued)

(56) References Cited

U.S. PATENT DOCUMENTS

2005/0065690 A1    3/2005  Ashizawa et al.

FOREIGN PATENT DOCUMENTS

CN    110271534 A    9/2019
JP    H07110712 A    4/1995
(Continued)

OTHER PUBLICATIONS

APC International, LTD, 2016 (Year: 2016).*
(Continued)

*Primary Examiner* — Alan D Hutchinson
(74) *Attorney, Agent, or Firm* — Womble Bond Dickinson (US) LLP

(57) ABSTRACT

Systems and methods are disclosed for reducing second order dynamics delays in a control subsystem (e.g. throttle, braking, or steering) in an autonomous driving vehicle (ADV). A control input is received from an ADV perception and planning system. The control input is translated in a control command to a control subsystem of the ADV. A reference actuation output is obtained from a storage of the ADV. The reference actuation output is a smoothed output that accounts for second order actuation dynamic delays attributable to the control subsystem actuator. Based on a difference between the control input and the reference actuation output, adaptive gains are determined and applied to the input control signal to reduce error between the control output and the reference actuation output.

20 Claims, 11 Drawing Sheets

(51) Int. Cl.
  *B60W 10/18* (2012.01)
  *B60W 10/20* (2006.01)
(58) Field of Classification Search
  CPC . B60W 2050/0024; B60W 2050/0037; B60W 2050/0008; B60W 2050/0014; B60W 60/001
  See application file for complete search history.

(56) References Cited

FOREIGN PATENT DOCUMENTS

| JP | 2004285915 A | 10/2004 |
|---|---|---|
| JP | 2018018398 A | 2/2018 |

OTHER PUBLICATIONS

Raffin, Andrea, Michele Taragna, and Michele Giorelli. "Adaptive longitudinal control of an autonomous vehicle with an approximate knowledge of its parameters." 2017 11th International Workshop on Robot Motion and Control (RoMoCo). IEEE, 2017. (Year: 2017).*

Liu, Yung-Tien, Kuo-Ming Chang, and Wen-Zen Li. "Model reference adaptive control for a piezo-positioning system." Precision engineering 34.1 (2010): 62-69. (Year: 2010).*

Sudin, M., and M. Sapiee. "Road vehicle following system with adaptive controller gain using model reference adaptive control method." Journal of Mechanical Engineering and Technology 11.5 (2009): 24-32. (Year: 2009).*

Raffin Andrea et al: "Adaptive Longitudinal Control of an Autonomous Vehicle With an Approximate Knowledge of it's Parameters", 2017 11th International Workshop On Robot Motion and Control (ROMOCO), IEEE, Jul. 3, 2017, 6 pages.

Sapiee Mohd Razali et al: "Road Vehicle Following System With Adaptve Controller Gain Using Mode; Reference Adaptive Control Method",Dec. 31, 2009, 10 pages.

Stork Milan et al: "Adaptive Control System for Autonomous Vehicle Path Following", 2019 International Conference On Applied Electronics (AE) Univerity of West Bohemia, Sep. 10, 2019, 4 pages.

Byrne R.H. et al: "Design of a Model Reference Adaptive Controller for Vehicle Road Following", Mathematical and Computer Modeling , Aug. 1, 1995, 12 pages.

* cited by examiner

MODEL REFERENCE ADAPTIVE CONTROL ALGORITHM TO ADDRESS THE VEHICLE ACTUATION DYNAMICS

TECHNICAL FIELD

Embodiments of the present disclosure relate generally to operating autonomous vehicles. More particularly, embodiments of the disclosure relate to an efficient, real-time process for addressing time-latency and actuation dynamic delay in control autonomous vehicle control subsystems, to improve autonomous vehicle control.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed (first order dynamics), without considering the second order dynamics of control subsystems, such as brakes, throttle, and steering.

Due to the usage of electronic determination and actuation of control systems such as brakes, throttle, and steering ("drive-by-wire"), there exists some latency time and system dynamic delays in the vehicle actuation system. Time-latency can occur due to delay in detecting that a control command is needed to stay on the planned trajectory. Time-latency can be attributable to data collection and processing time needed to identify objects surrounding the vehicle and attributable to computing of a control command needed to stay on the planned trajectory. Time-latency can be on the order of 50-100 milliseconds (ms). Actuation dynamic delay can occur in a control subsystem when a control command is received by a control subsystem, such as brakes, throttle, or steering, and the control subsystem must actuate physical components to execute the control command. Actuation dynamic delay can result in undesired throttling/braking/steering control responses, especially during rapid acceleration or sharp turning driving scenarios. For example, in a typical side-pass driving scenario, when the autonomous vehicle quickly changes to another lane from a current lane, the steering action usually presents some dynamic lag compared with the desired steering angle that is based on the steering command from the control module. As a result, the overall lane changing process can become unsmooth and be uncomfortable for passengers in the vehicle.

Actuation dynamic delay can be attributable to physical actuators or elements, such as motors, drive belts, brake pads and cylinders, or combustion, needing time to implement the physical actions that implement the control command. Actuation dynamic delay of a received command can manifest as a rise time of the actuation, an overshoot amount, and a settling time for a measured state of the physical actuator to match the received control command. Actuation dynamic delay can be on the order of several hundreds of milliseconds, substantially longer than latency.

Control subsystems such as brakes, steering, and throttle, are often provided by third-party suppliers, different from the party that develops a control system for the autonomous vehicle. Thus, developers of autonomous vehicle control subsystems must consider the operational characteristics of the control subsystems as a "black box." Accordingly, previous industrial efforts in the autonomous vehicle field attempt to design a simple proportional-integral-derivative (PID) controller on steering actuation to reduce the negative effects of the actuation dynamics. However, due to the over-simplified structure of PID-based controller, the PID controller can only increase the steering dynamic response to some extent, but cannot fully address the actuation time-latency and dynamic delay problem.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
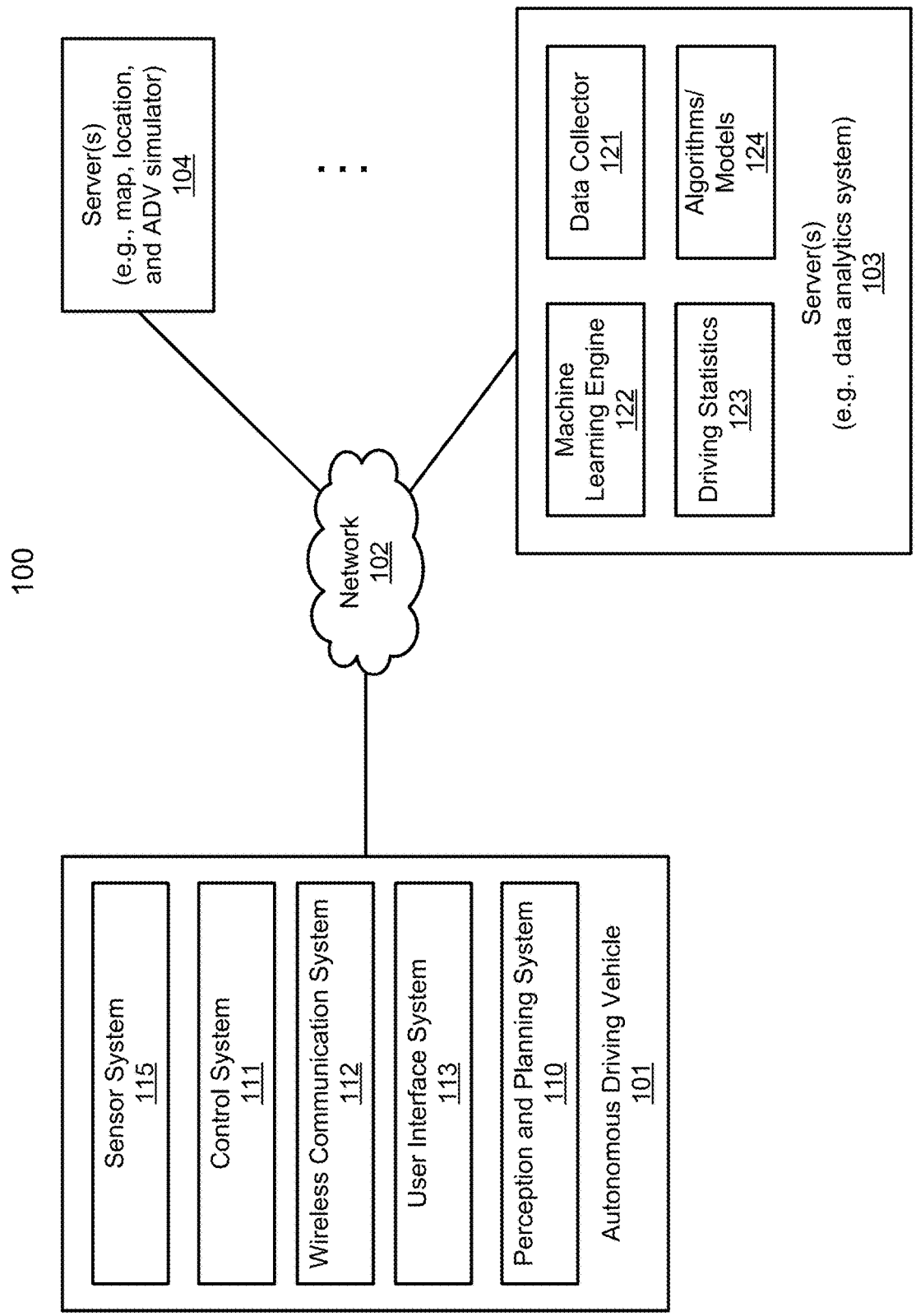
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In an embodiment, a method of improving performance of a control subsystem of an autonomous driving vehicle (ADV) control system includes receiving a control input to a feedback controller of an actuation system of the control subsystem (e.g. throttle, braking, steering) of the ADV. A reference actuation output corresponding to the control input is determined. The model reference actuation output can be determined by looking up the reference actuation output corresponding to the control subsystem and received control input, in a storage of the ADV. The reference actuation output can be based at least in part on actuation time latency and second order dynamics delays of the control subsystem. The second order dynamics delays of the control subsystem can include one or more of: time-latency in initiating a control action of the control subsystem, a rise time of the actuation, an overshoot amount of the actuation, or a settling time of the actuation of the control subsystem. The method also includes determining an error between an output actuation command of an actuator of the control subsystem and the reference actuation output, and determining an adaptive gain that is based upon the error. An actuation command is outputted to actuate the control subsystem. The actuation command is based upon the measured actuation action, desired input and the adaptive gain.

In an embodiment, the method includes repeating the operations of determining an error between an output actuation command of the actuator of the control subsystem and the reference actuation output, and determining an adaptive gain that is based upon the error; and outputting a next actuation command to actuate the control subsystem, until a measured state of actuation of the control subsystem is within a threshold value of the reference actuation output. The actuation command can be based upon the measured actuation action, desired input and the adaptive gain.

In an embodiment, any/all of the above method functionality can be implemented by a processing system, comprising one or more hardware processors coupled to a memory programmed with executable instructions that, when executed by the processing system, cause a computing system to implement the claimed functionality. In an embodiment, the memory can be a non-transitory computer-readable medium or other type of memory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, simulated autonomous vehicle driving servers, or location servers, etc. An autonomous vehicle driving simulator server 104 can include data logging of driving records substantially identical to the data logging of a real autonomous driving vehicle. The driving simulator can be used to test proposed updates to autonomous vehicle control systems. The driving simulator can upload its driving records for processing by, e.g., server 103 algorithms 124 to generate a set of standardized metrics 124 that characterize performance of the autonomous vehicle control system.

An autonomous vehicle 101 refers to a vehicle that can be configured to be driven in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode. As described herein, in some embodiments, an autonomous vehicle is simulated in an autonomous driving simulator of server 104. Characteristics and identifiers, such as an autonomous vehicle type (e.g. Lexus®, Honda®, SmartCar®, Kia®, et al.) and an autonomous vehicle controller type (e.g. model predictive control, or linear quadratic regulator) can be used to identify simulated autonomous vehicles within an autonomous driving simulation system and driving records generated by a simulated autonomous vehicle driving session.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
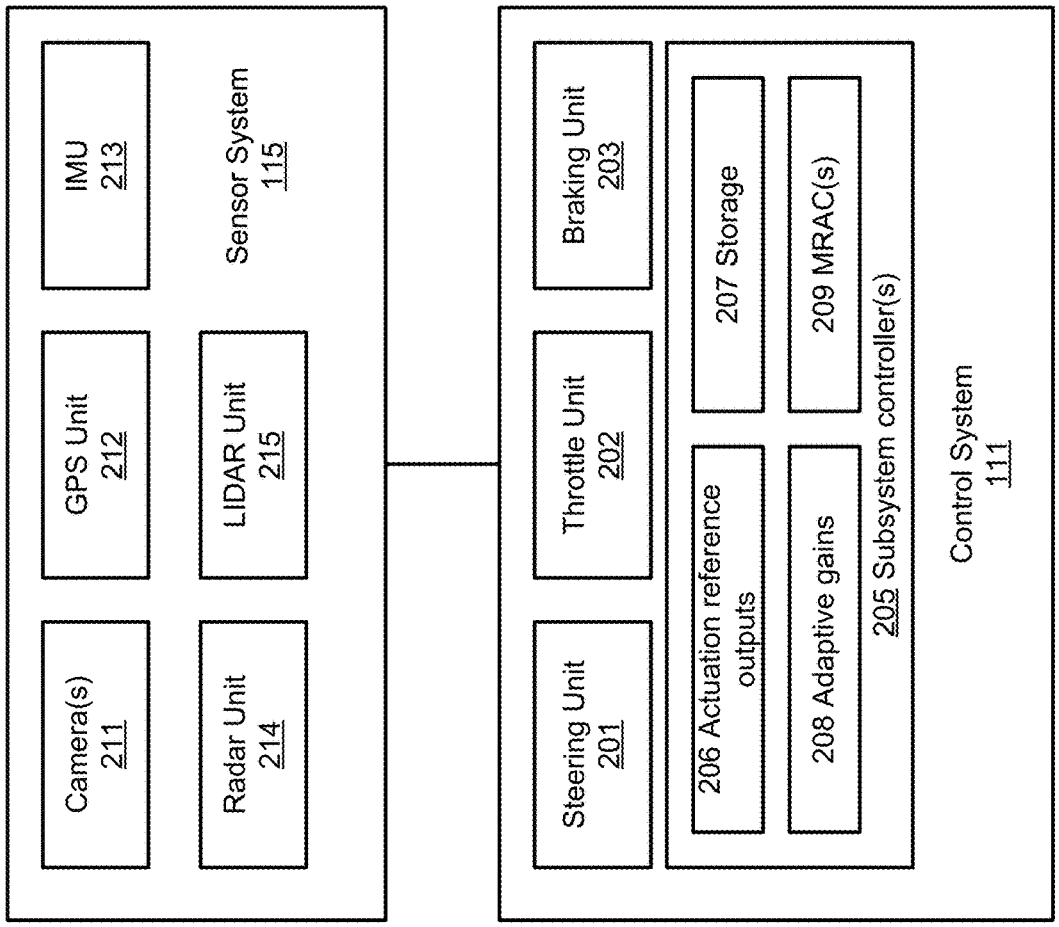
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle.

Control system 111 may further comprise subsystem controllers 206. Subsystem controllers 205 can include a controller for the steering unit 201, a controller for the throttle unit 202, and a controller for the braking unit 203. Each subsystem controller 205 receives one or more control commands from the ADV control system 111. As described with reference to FIG. 3C, below, the ADV control system 111 receives a trajectory path for the ADV to follow to navigate a portion of an ADV route. The control system 111 can determine an amount of steering, braking, and/or throttling that is needed to navigate the ADV along the trajectory path. Control system 111 then issues one or more commands to one or more control subsystems (steering unit 201, throttle unit 202, braking unit 203). A steering command can be in the form of a target steering angle, e.g. to the left or right of straight ahead, expressed in degrees or radians. A throttle command from the control system 111 to the throttle unit 202 can be e.g. a target speed, acceleration, or percentage of full throttle. A braking command from the control system 111 to the braking unit 203 can be, e.g. a target speed, a deceleration rate, or a percentage of full braking. Each control command from control system 111 to a control subsystem (steering unit 102, throttle 202, or braking 203) can be translated into a physical action on the control subsystem by a controller within the subsystem.

The physical actuation by a control subsystem of a command received from the control system 111 is not immediate. A time-latency in physical actuation represents a difference between a time issuing of a command from the controller 111 and the time that the subsystem controller outputs a command to begin the physic actuation. After execution of the command begins by the subsystem controller, dynamic delays exist in executing the command to attain the physical target actuation commanded by the controller 111. The systems and methods described herein determine metrics for each subsystem controller that characterizes the time-latency and dynamic delays in physical actuation of the subsystem. An example command from an ADV controller to a subsystem controller, and the resulting time-latency and actuation dynamics of the subsystem are described below with reference to FIG. 3C.

Subsystem controller(s) 205 can include storage for reference actuation outputs 206, storage 207 for e.g. parameters of the dynamic models, storage 208 for adaptive gains, and logic or updates for one or more model reference adaptive controllers (MRAC) 209. Reference actuation outputs 206, adaptive gains 208, and MRACs 209 are described more fully, below, with reference to FIGS. 5A-5C.

Subsystem controllers 205 can be integrated with ADV controller 111 or as third-party stand-alone subsystem controllers. In practice, subsystem controllers are often third-party controllers such that the ADV control system communicates with the subsystem controller via a programming interface, and the specifics of how a command is executed and actuated by the control subsystem are a "black box" to the ADV controller designer. Compensating for the time-latency and actuation dynamic delays of a subsystem, as described herein, enable an ADV to adaptively account for time-latency and actuation dynamic delays of a subsystem without needing to know the cause or reason for the time-latency and actuation dynamic delays. Control subsystem time-latency and actuation dynamic delay are particularly important in driving scenarios that require rapid braking, accelerating, or steering. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Autonomous driving vehicle (ADV) 101 can generate and log driving records that capture data from the subsystems, e.g. sensor system 115, control system 111, and perception and planning system 110. The driving records can be uploaded to a server, e.g. server 103, for storage by data collector 121. A cross-platform control profiling system, stored in e.g. server 103 algorithms and models 124, can analyze driving records from a large plurality of ADVs and simulated ADVs to generate driving Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a cross-platform control profiling system that generates a set of standardized statistics, or metrics, 123 characterizing performance of an autonomous driving control system of the ADV using ADV driving data and simulated ADV driving data ("cross-platform" meaning both real and simulated ADV driving records). Raw driving data records are uploaded from an ADV at a specified time, or manually, to date collector 121. Simulated ADV driving data is also uploaded to data collector 121. Algorithms 124 are used to generate the set of set of standardized metrics characterizing the performance of the ADV control system. The metrics are stored in driving statistics 123, and distributed to subscribing users, such as design engineers.

Figure 3A:
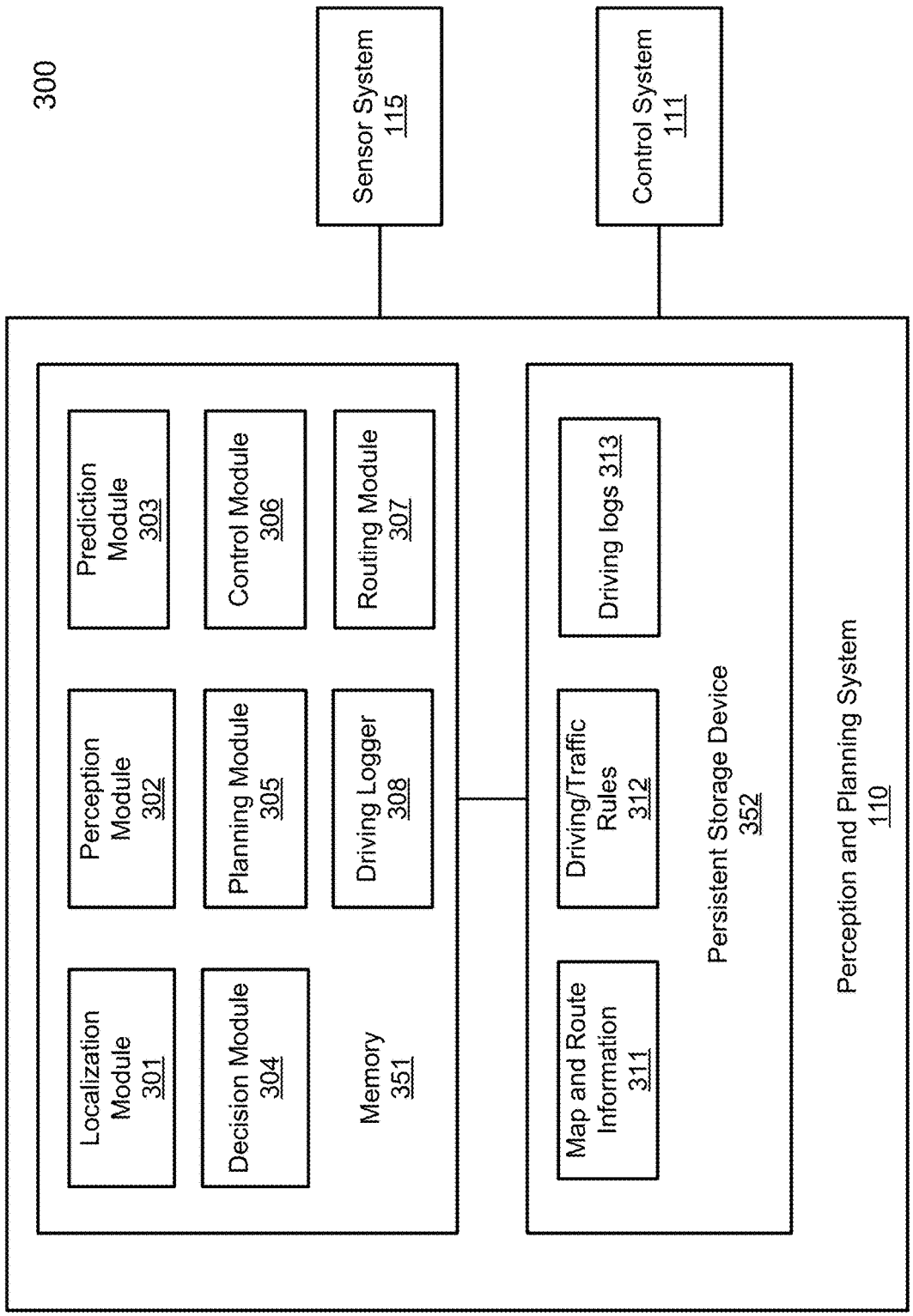
FIGS. 3A and 3B are block diagrams illustrating an example of a perception and planning system used with an autonomous vehicle according to one embodiment.
Figure 3B:
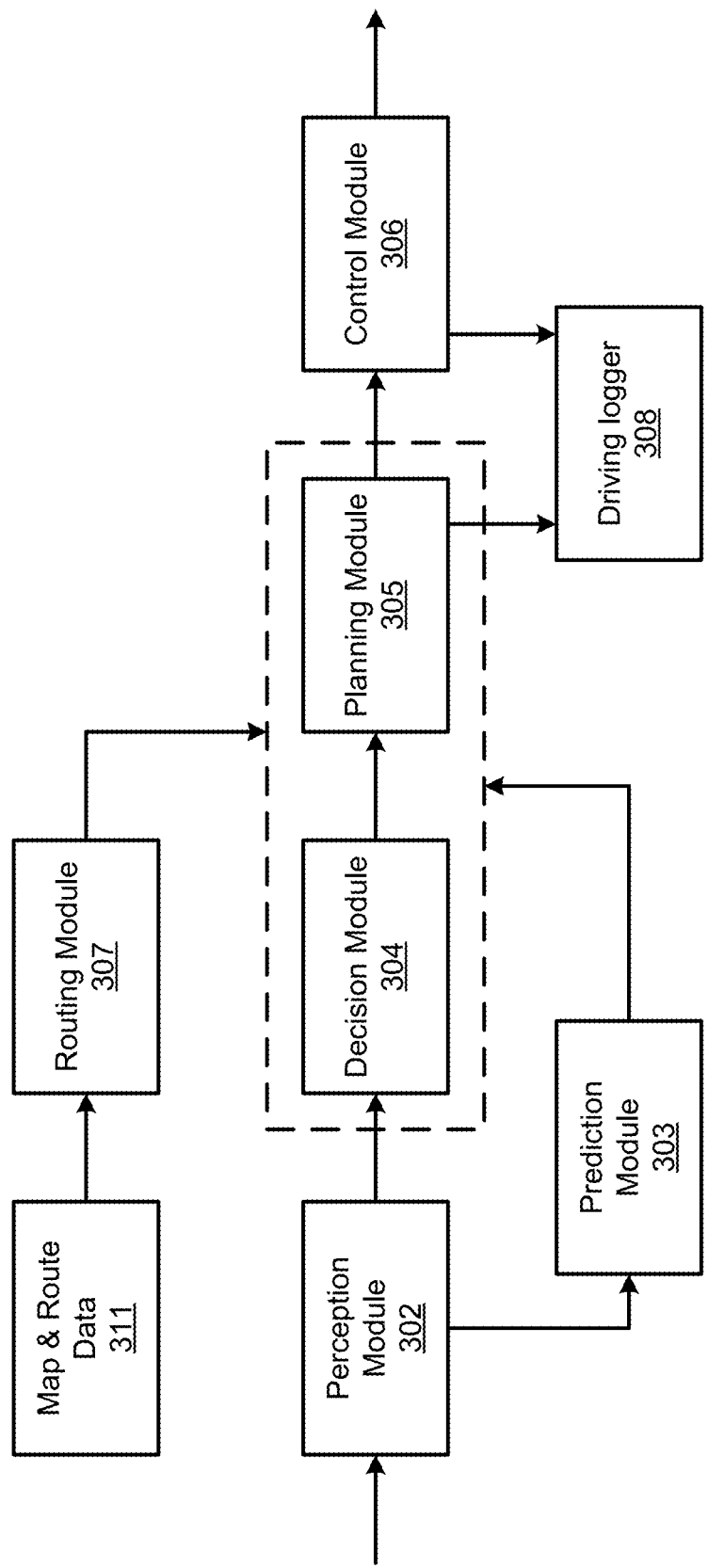

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and driving logger 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Driving logger 308 records driving records from at least three data channels of the ADV control system: the control channel, the chassis channel, and the localization channel. The control channel produces information about control commands to control systems of the ADV, such as braking, throttle, and steering. The chassis channel produces information from various sensors, such as accelerometers, and readings of actual positions or actuations of the braking, throttle, and steering systems. The localization channel produces information regarding the actual location and heading of the ADV with reference to a standard reference such as a high-definition (HD) map or a global positioning satellite (GPS) system. Data records can be recorded at approximately 100 frames per second (fps), or at about 10 milliseconds (ms) per frame. Each driving record has a timestamp. A timestamp can be an absolute timestamp in the form of hh:mm:ss:ms (hours, minutes, seconds, milliseconds) relative to a start time, such as the start of a driving route. In embodiment, the timestamp can be a frame number, relative to a start time such as the start of the driving route. In an embodiment, each driving record can additional have a date stamp in addition to the time stamp. Data logger 308 can log driving records for simulated ADV driving sessions as well as real-world ADV driving sessions.

Data logger 308 can write the driving records to a non-volatile storage such as driving logs storage 313. Driving logs 313 can be uploaded to a server system, e.g. server(s) 103-104, to generate a set of standardized performance metrics that grade the performance of a controller of the ADV. The controller of the ADV can be updated using the standardized set of metrics, and the updated controller of the ADV can be stored in non-volatile storage 314.

As shown on FIG. 3B, data logger 308 can also receive driving records from the planning module. The planning module driving records can be used to compare planned driving conditions vs. actual (or simulated) driving conditions, to grade the performance of the ADV controller.

Figure 3C:
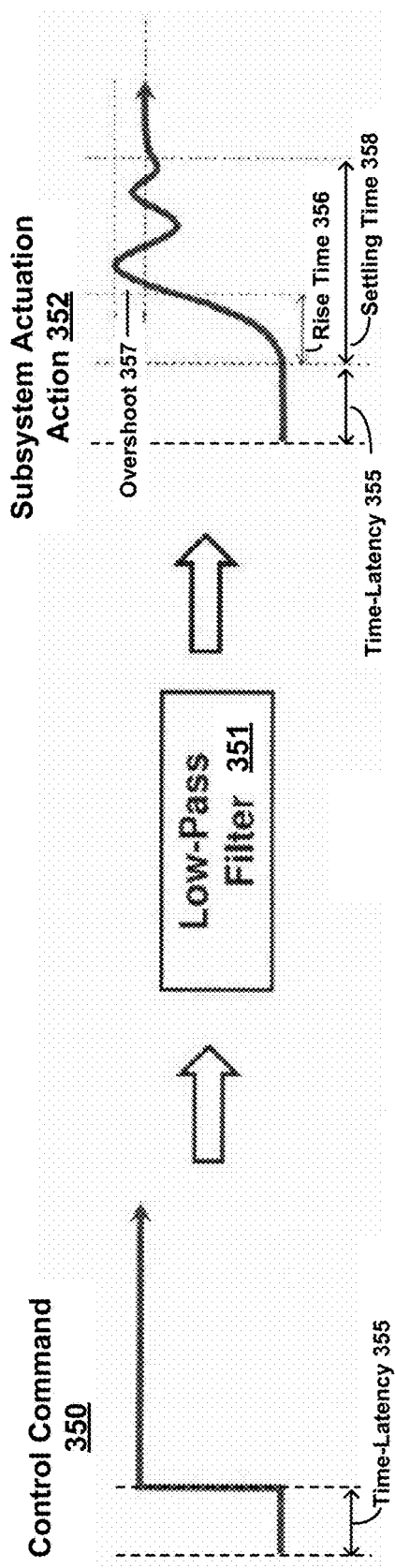
FIG. 3C illustrates an example ADV control command and an autonomous vehicle control subsystem actuation action response to the control command, according to an embodiment.

FIG. 3C illustrates an example ADV control command and an autonomous vehicle control subsystem actuation action response to the control command, according to an embodiment. A hypothetical example control command 350 is shown as a step function. In practice, control inputs typically are not step functions. However, the control input well-illustrates the concepts to be described herein. Control command 350 has a time-latency 355. The time-latency is a time between a control input given by ADV control system 111, given to an ADV control subsystem (e.g. throttle, steering, brakes), and the beginning of actuation of the control subsystem in response to the control input.

The control command 350 can be passed through a low-pass filter 351 before being passed to the subsystem actuation 352. ADV's are "drive-by-wire," meaning that the control subsystem actuation is via transmission of a control command. In practice, control subsystem actuators are often provided by third parties, different from the designers of the ADV or the ADV controller. Thus, while the designer of the ADV or ADV controller is aware that there are actuation delays, such as rise time 356, overshoot 357, and rise time 356, the designer of the ADV or ADV controller does not know the exact sources or causes of the actuation delays. To the ADV designer or ADV controller designer, the control subsystem actuator is merely a "black box," which has actuation delays in relation to input control commands. Systems and methods described herein can account for the actuation delays and time-latency using a reference actuation output, adaptive gains, and a closed loop subsystem controller.

Figure 3D:
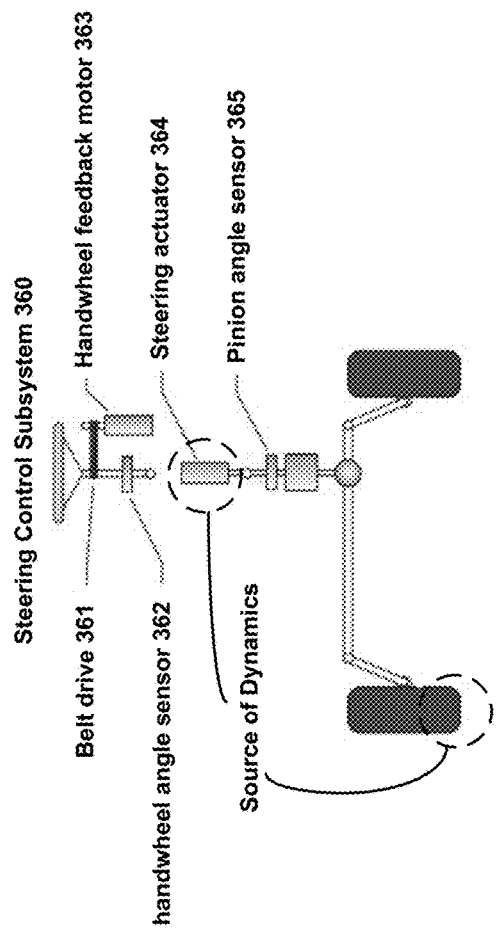
FIG. 3D illustrates a steering control subsystem as used in an autonomous vehicle, and sources of dynamics, according to an embodiment.

FIG. 3D illustrates a steering control subsystem as used in an autonomous vehicle, and sources of dynamics, according to an embodiment.

Steering control subsystem 360 is an example control subsystem of ADV 101. Steering subsystems in ADVs are typically "drive by wire" systems that receive a control command, e.g. control command 350, and execute the control command through physical and electronic means. Steering control subsystem 360 can include a belt drive 361, a hand wheel feedback motor 363, a hand wheel angle sensor 362, a steering actuator 364, a pinion angle sensor, and tires. Steering actuator 364, e.g., and tires, may introduce sources of actuation dynamic delay.

Figure 4:
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
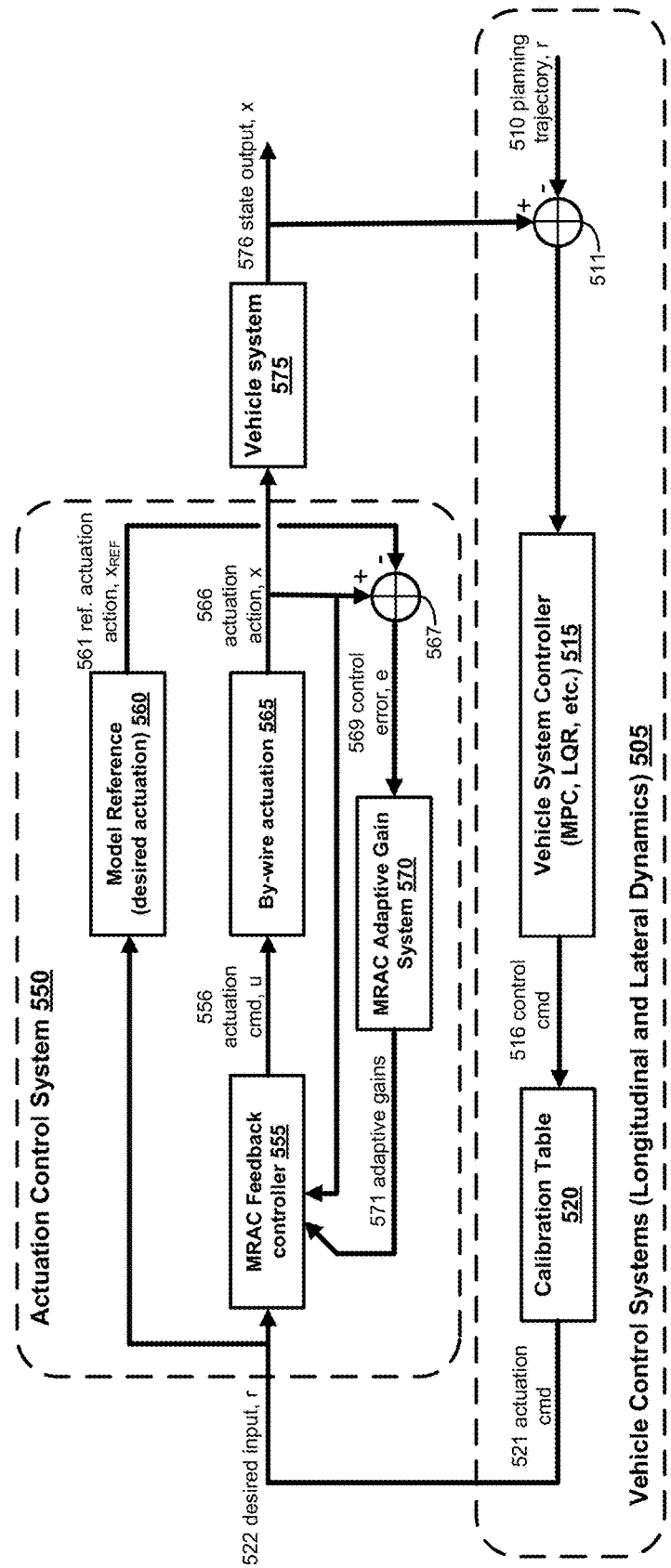
FIG. 5A is a block diagram 500 illustrating a data flow and a system that incorporates a model reference adaptive controller (MRAC) that improves actuation of one or more control subsystems of an autonomous driving vehicle (ADV), according to one embodiment.

FIG. 5A is a block diagrams illustrating a data flow and a system 500 that incorporates a model reference adaptive controller (MRAC) that improves actuation of one or more control subsystems of an autonomous driving vehicle (ADV), according to one embodiment. Control subsystems can include braking, throttling, and steering systems of the ADV. When actuating a control subsystem using "drive-by-wire", there are second order dynamics delays and a time-latency of the control subsystem. Second order dynamics delays can include rise time, overshoot, and settling time of the measured state of actuation of the control subsystem, relative to the input actuation command. Actuation control system 550 can reduce the second order actuation dynamic delays to produce a smoother actuation control of a control subsystem using model reference 560, model reference adaptive control (MRAC) feedback controller 555, and MRAC adaptive gain system 570.

The system 500 includes a vehicle control system 505 and an actuation control system 550. Actuation control system 550 can include functionality for all control subsystems (throttle, braking, steering). In an embodiment, one or more control subsystems each have a respective actuation control system 550. Vehicle control system 505 can include a vehicle system controller 515 and calibration table 520. Vehicle control system 505 can be considered an "outer loop" with respect to actuation control system 550 being an "inner loop" which can iterate as fast, or faster, than the vehicle control system 505 "outer loop."

In operation, vehicle control system 505 receives a planning trajectory, r, 510, from a perception and planning system, e.g. perception and planning system 111, of the ADV. A summing circuit 511 receives the planning and trajectory 510 signal and also receives a state output, x, 576 of the vehicle system 575. State output 576 represents a current measured state of actuation of a control subsystem of vehicle system (e.g. chassis) 575. For example, planning and trajectory 510 may specify that a steering subsystem is commanded to be actuated to 8° left of center, and state output 576 reports that the current state of the steering subsystem is 5° left of center. Summing circuit 511 can report the difference as an additional 3° left of center, to vehicle system controller 515.

Vehicle system controller 515 can be any type of ADV vehicle controller such as model predictive controller (MPC) or a linear quadratic regulator (LQR). Vehicle system controller 515 outputs a control command 516 (e.g. a steering command) to calibration table 520. Calibration table 520 generates a subsystem control actuation command 521, e.g. a command to actuate the steering control subsystem to the planning trajectory 510 input of 8° with a steering input of an additional 3° left of center command (desired input 522) to achieve the 8° left of center indicated in the planning and trajectory signal 510. The desired input, r, 522 is input to both the MRAC feedback controller 555 and the model reference (desired actuation) 560.

Figure 5B:
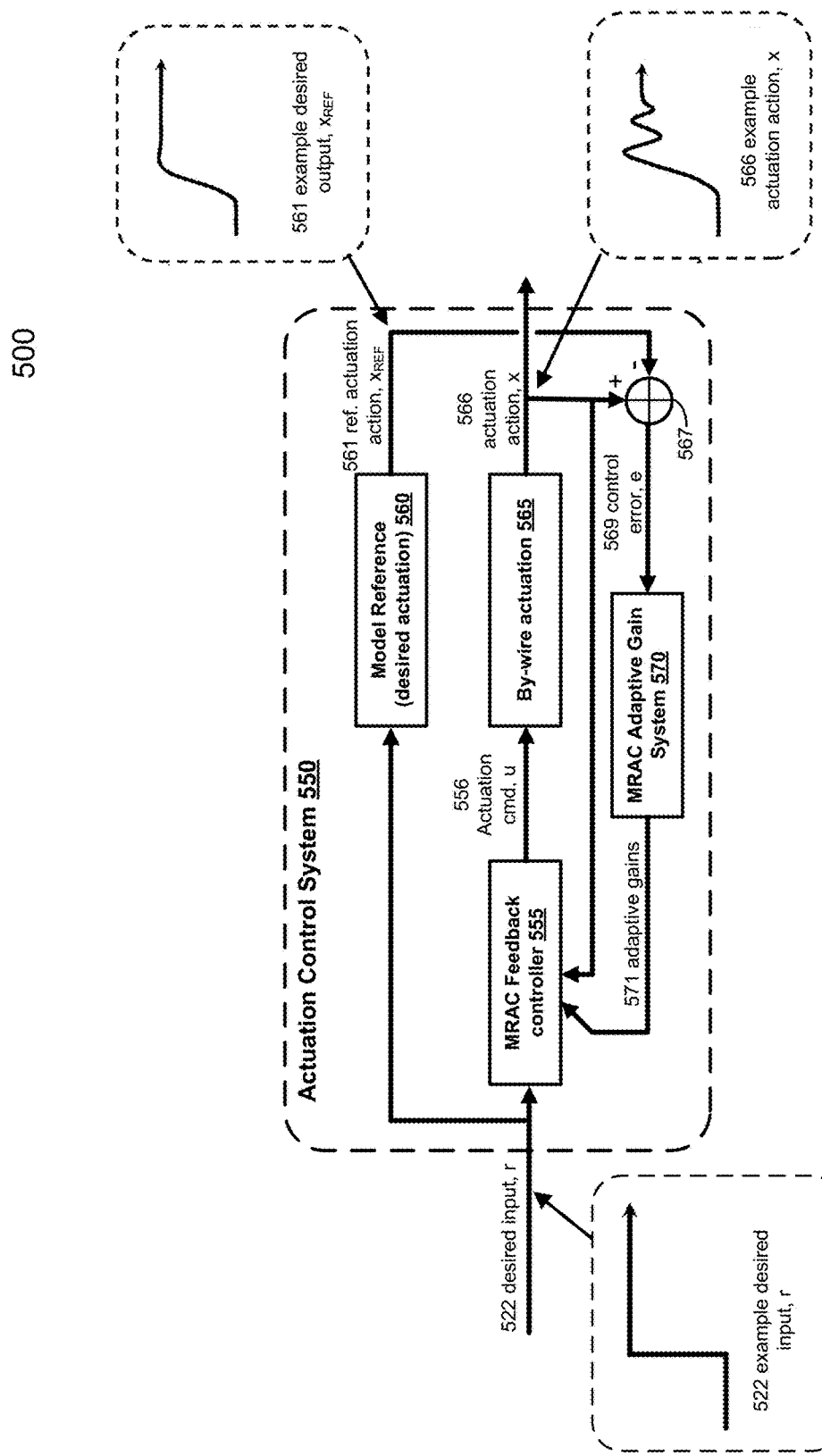
FIG. 5B is a block diagram illustrating a data flow of the model reference adaptive controller, according to one embodiment.

Referring now to FIG. 5B, an example desired input 522 is shown as a step function input to the actuation control system 550. In practice, input to an actuation system of a control subsystem is rarely a step function. However, the step function serves to illustrate the second order actuation dynamics of actuation control system 550. Second order actuation dynamics are also described above, with reference to FIG. 3C.

The function of model reference 560 is to create a "desired" system to compare with the "imperfect" actuation system of vehicle control system 505, then the error between the model reference 560 and the vehicle control system 505 is used in the adaptive process to adaptively generate gains so that the control subsystem actuation can achieve the model reference, within a threshold tolerance. Model reference 560 can look up a reference actuation output 561 that corresponds to the received desired input 522. The reference actuation output can be retrieved from reference actuation outputs 206 of subsystem controller(s) 205 as shown with reference to FIG. 2, above. Model reference 560 can be a machine generated, or a manually generated, actuation curve that takes into account the second order dynamics delays of the control subsystem. For example, given the example desired input 522, model reference 560 looks up example desired reference output, $x_{REF}$ 561. Desired reference output 561 is received by summation circuit 567.

At substantially the same time that model reference 560 is determining reference actuation output 561, MRAC feedback controller 555 receives desired input 522. Assuming that time desired input 561 was received by MRAC feedback controller 555 is received at a time $t_0$, MRAC feedback controller 555 will not yet have received adaptive gains related to desired input 522. Thus, at time $t_0$, MRAC feedback controller may pass desired input 522 to by-wire actuation system 565 as actuation command, u, 566, without adaptive gains 571. In practice, by-wire actuation system 565 is very often a third party component which is treated as a black box. Thus, by-wire actuation system 565 generates an actuation action, x 566 in accordance with the programming or logic of actuation system 565 as produced by the manufacturer of by-wire actuation system 565. Actuation action 566 is received by (1) summation circuit 567 and (2) by MRAC feedback controller 555 as input for MRAC feedback controller 555 at time $t_1$.

Summation circuit 567 determines a control error, e, 569 that is the difference between the actuation action 566 output by the by-wire actuation system 565 at time $t_0$ and the reference actuation output 561 by model reference 560 at time $t_0$. MRAC adaptive gain system 570 determines an amount of adaptive gain 571 to pass to MRAC feedback controller 555 to determine an actuation command 566 to transmit to by-wire action 565 at time $t_1$. MRAC adaptive gain system 570 performs on-line adjustments using adaptive gains to ensure the convergence and stability of the closed-loop actuation control system 550. In an embodiment, adaptive gain 571 can be determined by MRAC adaptive gain system 570 as follows.

(1) "Ideal" feedback control, with "ideal" gains:

$$u = k_x^* x + k_r^* r, \text{ wherein}$$

$$k_x^* = \frac{a_{ref} - a}{b}, k_r^* = \frac{b_{ref}}{b}, \text{ and}$$

$$\dot{x} = ax + bu \Rightarrow \dot{x} = a_{ref} x + b_{ref} r$$

(2) Adaptive feedback control with estimated, time-varying gains:

$$u = \hat{k}_x(t)x + \hat{k}_r(t)r, \text{ where}$$

$$\dot{\hat{k}}_x = -\gamma_x x(x - x_{ref}),$$

$$\dot{\hat{k}}_r = -\gamma_r r(x - x_{ref}), \text{ and}$$

$\gamma_x, \gamma_r, >0$ are constant adaptive gains that determine the convergence rate of the adaptive process.

(3) Actual system—reference system:

$$(\dot{x} - \dot{x}_{ref}) = a(x - x_{ref}) + b(\hat{k}_x(t)x - k_x^* x_{ref}) + b(\hat{k}_r(t)r + k_r^* r)$$

(4) Closed-loop error dynamics is given by the nonlinear, non-autonomous 3$^{rd}$ order system:

$$e = x - x_{ref} \xrightarrow{\text{output error}} \dot{e} = a_{ref} e + b\bar{k}_x[e + x_{ref}] + b\bar{k}_r r,$$

$$\bar{k}_x(t) = \hat{k}_x(t) - k_x^* \xrightarrow{\text{adaptive gain error}} \dot{\bar{k}}_x = -\gamma_x e[e + x_{ref}], \text{ and}$$

$$\bar{k}_r(t) = \hat{k}_r(t) - k_r^* \xrightarrow{\text{adaptive gain error}} \dot{\bar{k}}_r = -\gamma_r r.$$

(5) The non-linear, time-varying stability system expression is:

$$\dot{e} = a_{ref} e + b\bar{k}_x [e + x_{ref}(t)] + b\bar{k}_r r(t),$$

$$\dot{\bar{k}}_x = -\gamma_x e[e + x_{ref}(t)], \text{ and}$$

$$\dot{\bar{k}}_r = -\gamma_r r(t).$$

As $e \rightarrow 0, x(t) \rightarrow x_{ref}(t)$.

MRAC feedback controller 555 generates a realizable actuation control command 556 by feeding back the inputs and states of the control subsystem using the dynamically-tuned adaptive gains 571. The control command 556 is sent to the by-wire actuation system 565, to further produce an actuation action 566 in the next iteration, which is closer to the reference actuation action 561.

Figure 5C:
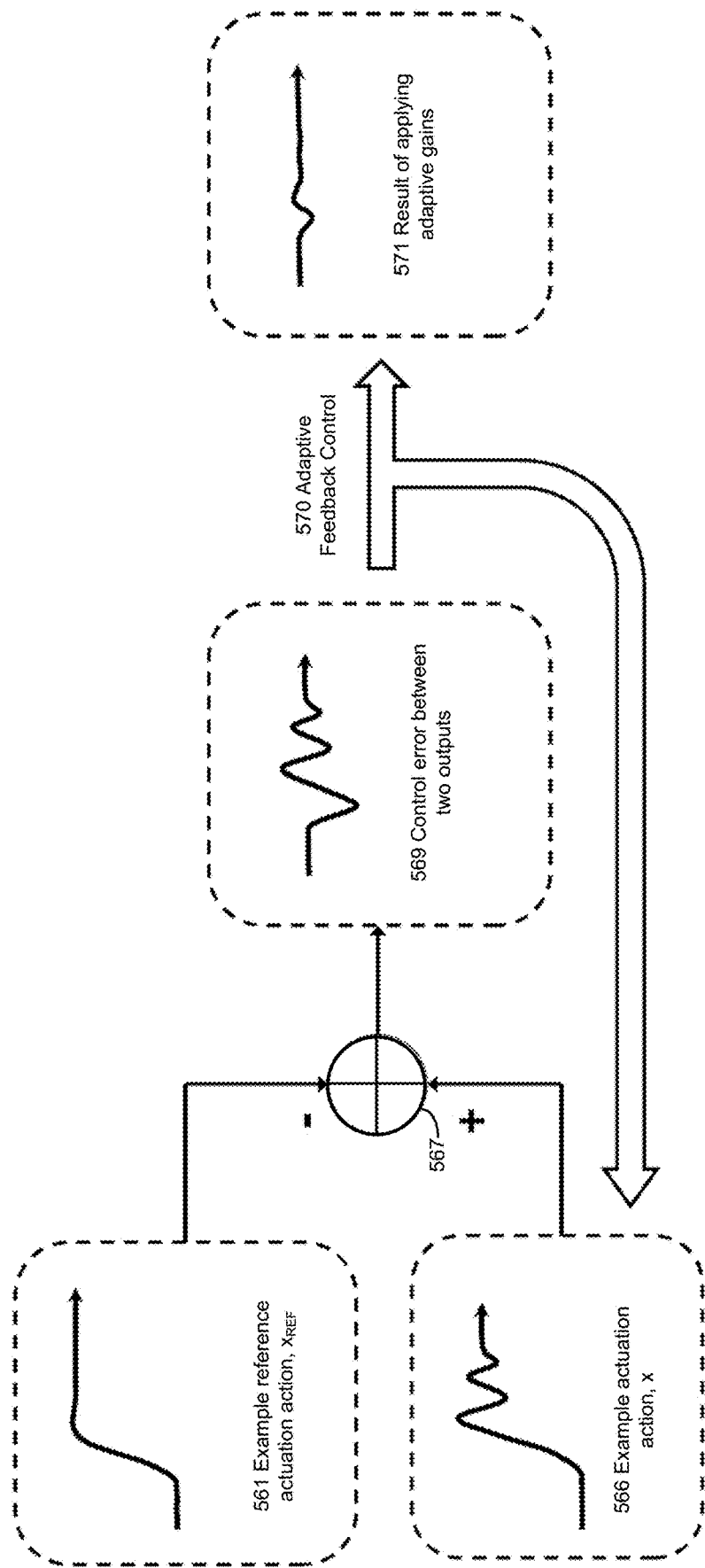
FIG. 5C is a block diagram illustrating subsystem control actuation, as modified by the model reference adaptive controller, according to one embodiment.

Referring now to FIG. 5C, further illustrating the details of FIGS. 5A and 5B, example reference actuation output 561 is summed with example actuation action 566 by summing or combining circuit 567. The combined result is output as control error 569 to the MRAC feedback gain system 570. The result of applying the adaptive gains from MRAC adaptive gain system 570 to the actuation action 566 generates an actuation signal 571 with reduced error for a next iteration of the MRAC adaptive gain system 570 and MRAC feedback controller 555.

Figure 6:
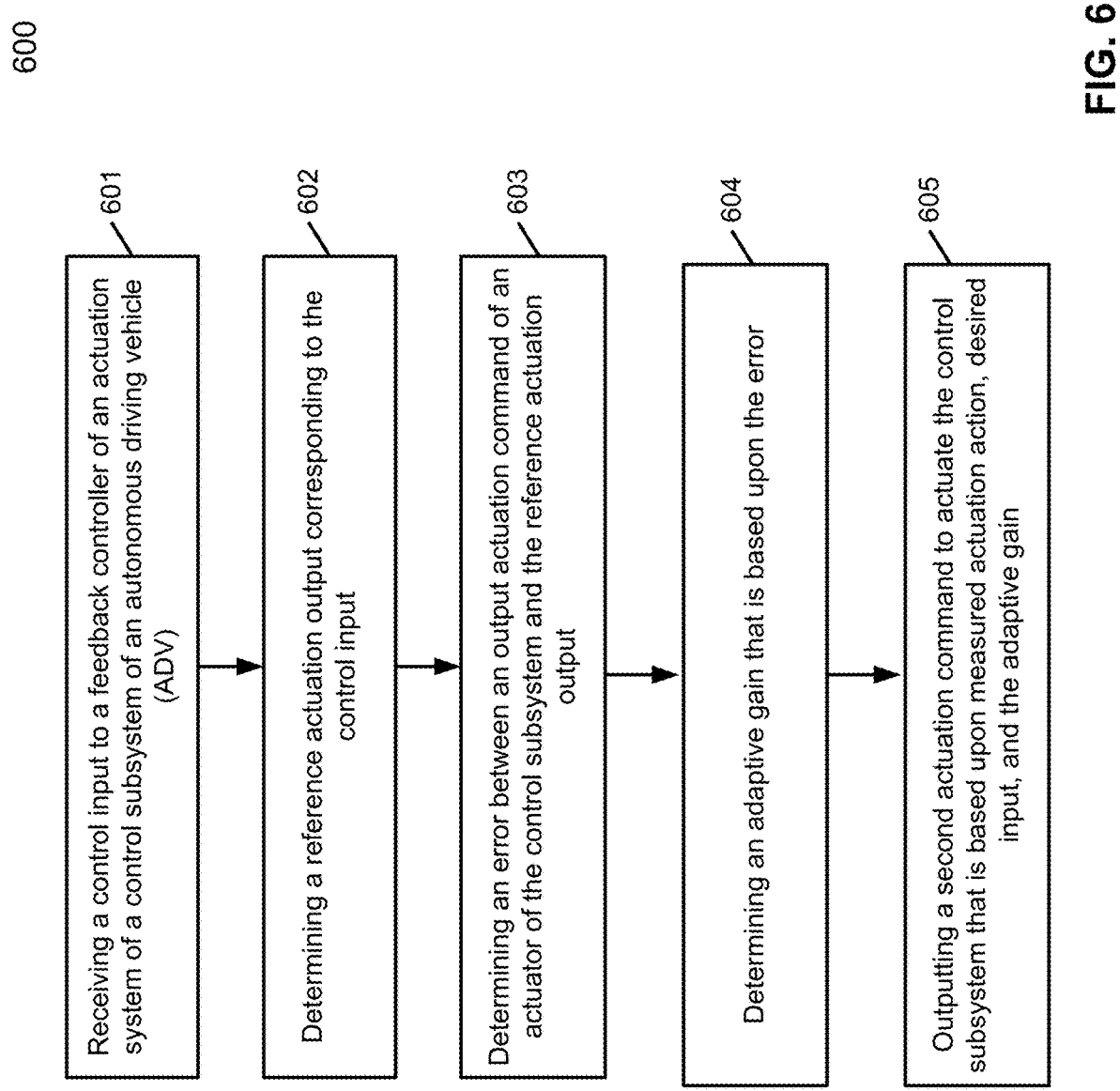
FIG. 6 is a block diagram illustrating a method of improving actuation of a control subsystem (e.g. throttle, braking, steering) using a model reference adaptive controller, according to one embodiment.

FIG. 6 is a block diagram illustrating a method 600 of improving actuation of a control subsystem (e.g. throttle, braking, steering) using a model reference adaptive controller (MRAC), according to one embodiment.

In operation 601, a control input is received to a feedback controller 555 of an actuation control system 550 of a control subsystem (e.g. throttle, brake, or steering) of an ADV.

In operation 602, a reference actuation output corresponding to the received control input can be determined. In an embodiment, the reference actuation output for the control subsystem corresponding to the received control input can be looked up in a storage of subsystem controllers 205, in reference actuation outputs 206.

In operation 603, an error amount between an output actuation command of an actuator of the control subsystem, and the reference actuation output, can be determined. The error amount can be determined, e.g., by summing circuit 567 of actuation control system 550 as described above with reference to FIG. 5A-5C.

In operation 604, an adaptive gain amount can be determined, using the error amount.

In operation 605, the second actuation command to actuate the control subsystem that is based upon the measured actuation action, desired input and the adaptive gain, is output to the control subsystem. Method 600 ends.

Figure 7:
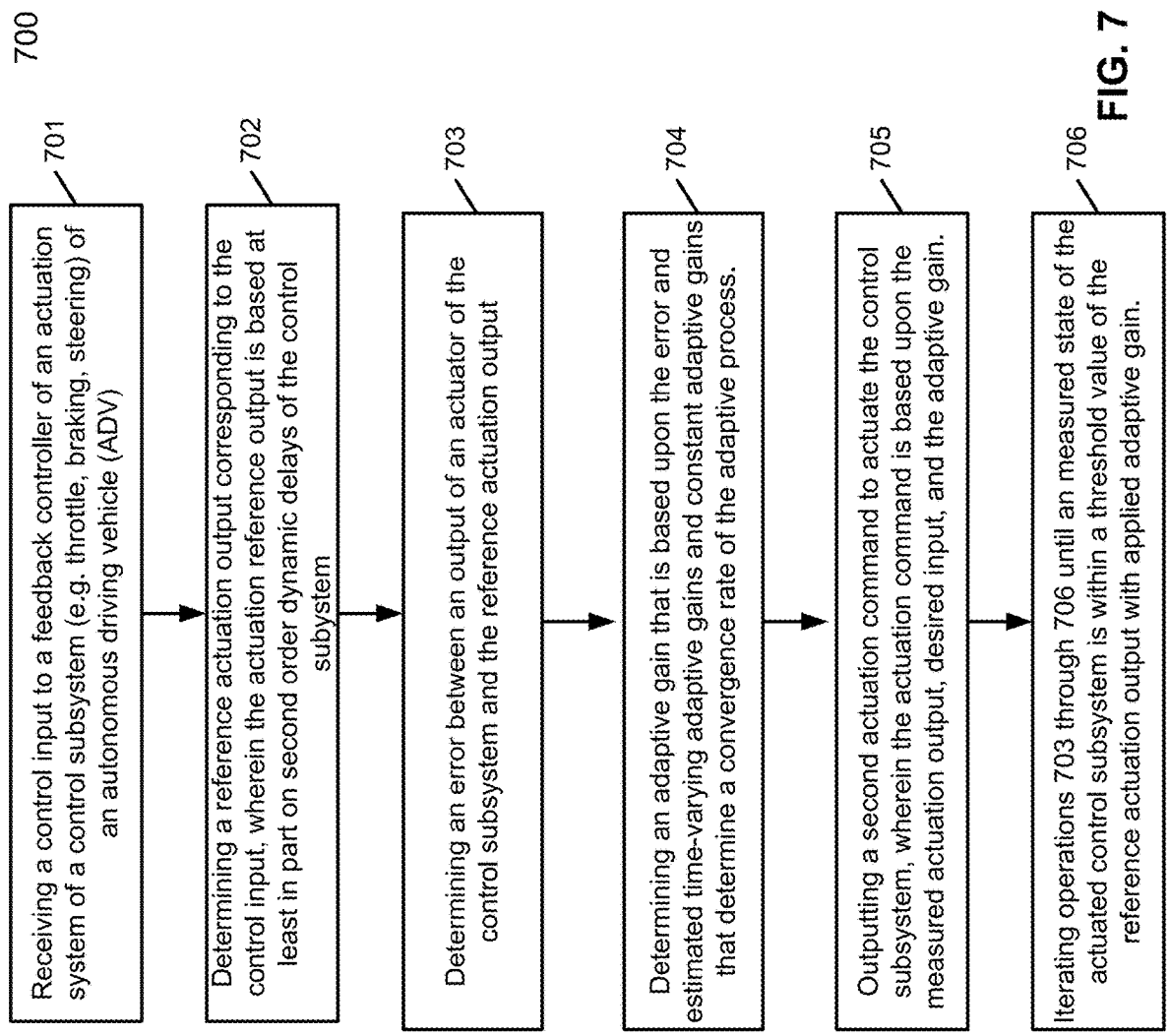
FIG. 7 is a block diagram illustrating a method of improving actuation of a control subsystem (e.g. throttle, braking, steering) using a model reference adaptive controller, according to one embodiment.

FIG. 7 is a block diagram illustrating a method 700 of improving actuation of a control subsystem (e.g. throttle, braking, steering) using a model reference adaptive controller, according to one embodiment.

In operation 701, a control input is received to a feedback controller 555 of an actuation control system 550 of a control subsystem (e.g. throttle, brake, or steering) of an ADV.

In operation 702, an reference actuation output corresponding to the received control input can be determined. In an embodiment, the reference actuation output for the control subsystem corresponding to the received control input can be looked up in a storage of subsystem controllers 205, in reference actuation outputs 206. The reference actuation output can be based at least in part on second order dynamic delays of the control system.

In operation 703, an error amount between an output actuation command of an actuator of the control subsystem, and the reference actuation output, can be determined. The error amount can be determined, e.g., by summing circuit 567 of actuation control system 550, as described above with reference to FIG. 5A-5C.

In operation 704, an adaptive gain amount can be determined, using the error amount. In an embodiment, the adaptive gain can be based at least in part upon time-varying adaptive gains, and constant adaptive gains that determine a convergence rate of the adaptive process. The adaptive gain can be applied to the reference actuation output to obtain a second actuation command to the control subsystem.

In operation 705, a second actuation command can be output to actuate the control subsystem. The second actuation command is based upon the measured actuation output, desired input and the adaptive gain.

In operation 706, operations 703-705 can be repeated until a measured state of the actuated control subsystem is within a threshold value of the reference actuation output with applied adaptive gain. Method 700 ends.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of actuating a by-wire actuation system of an autonomous driving vehicle (ADV) control system, the method comprising:
   a vehicle control loop process including:
      determining a state error between a measured state output of a vehicle system and a planning trajectory of the vehicle system, and determining a control command based upon the state error and determining a first actuation command from the control command; and an actuator control loop process coupled to the vehicle control loop process, the actuator control loop process including:

at a feedback controller, receiving the first actuation command, an adaptive gain, and a measured actuation action and outputting a second actuation command based on the first actuation command, the adaptive gain, and the measured actuation action, at a model reference system, receiving the first actuation command and outputting a reference actuation action, at the by-wire actuation system, receiving the second actuation command and outputting the measured actuation action to the vehicle system, determining a control error between the measured actuation action and the reference actuation action, and determining the adaptive gain based upon the control error.

2. The method of claim 1, wherein the reference actuation action is based at least in part on second order attributes of the by-wire actuation system.

3. The method of claim 2, wherein the second order attributes of the by-wire actuation system include one or more of: time-latency in initiating a control action of the by-wire actuation system, a rise time, an overshoot amount, or a settling time of an actuator of the by-wire actuation system.

4. The method of claim 1, wherein the first actuation command is received at the feedback controller during a current driving cycle of the ADV and the measured actuation action was received at the feedback controller during a prior driving cycle.

5. The method of claim 1, wherein the first actuation command and the measured actuation action are received from an autonomous driving system that is configured to plan a trajectory to drive the ADV based on sensor data obtained from a plurality of sensors of the ADV in view of vehicle states obtained from a vehicle chassis of the ADV.

6. The method of claim 1, wherein the by-wire actuation system comprises at least one of a throttle control subsystem, a braking control subsystem, or a steering control subsystem.

7. The method of claim 1, further comprising iteratively performing determining the control error, determining an adaptive gain, and outputting a next second actuation command to actuate the by-wire actuation system, until the measured actuation action is within a threshold value of a reference actuation output with an applied adaptive gain.

8. A non-transitory machine-readable medium having instructions stored therein, which when executed by a processor, cause the processor to perform operations of actuating a by-wire actuation system of an autonomous driving vehicle (ADV) control system, the operations comprising:

a vehicle control loop process including:
determining a state error between a measured state output of a vehicle system and a planning trajectory of the vehicle system, and
determining a control command based upon the state error and determining a first actuation command from the control command; and an actuator control loop process coupled to the vehicle control loop process, the actuator control loop process including:

at a feedback controller, receiving the first actuation command, an adaptive gain, and a measured actuation action and outputting a second actuation command based on the first actuation command, the adaptive gain, and the measured actuation action, at a model reference system, receiving the first actuation command and outputting a reference actuation action, at the by-wire actuation system, receiving the second actuation command and outputting the measured actuation action to the vehicle system, determining a control error between the measured actuation action and the reference actuation action, and determining the adaptive gain based upon the control error.

9. The machine-readable medium of claim 8, wherein the reference actuation action is based at least in part on second order attributes of the by-wire actuation system.

10. The machine-readable medium of claim 9, wherein the second order attributes of the by-wire actuation system include one or more of: time-latency in initiating a control action of the by-wire actuation system, a rise time, an overshoot amount, or a settling time of an actuator of the by-wire actuation system.

11. The machine-readable medium of claim 8, wherein the first actuation command is received at the feedback controller during a current driving cycle of the ADV and the measured actuation action was received at the feedback controller during a prior driving cycle.

12. The machine-readable medium of claim 8, wherein the first actuation command and the measured actuation action are received from an autonomous driving system that is configured to plan a trajectory to drive the ADV based on sensor data obtained from a plurality of sensors of the ADV in view of vehicle states obtained from a vehicle chassis of the ADV.

13. The machine-readable medium of claim 8, wherein the by-wire actuation system comprises at least one of a throttle control subsystem, a braking control subsystem, or a steering control sub system.

14. The machine-readable medium of claim 8, wherein the operations further comprise iteratively performing determining the control error, determining an adaptive gain, and outputting a next second actuation command to actuate the by-wire actuation system, until the measured actuation action is within a threshold value of a reference actuation output with an applied adaptive gain.

15. An actuation control system for actuating a by-wire actuation system of an autonomous driving vehicle (ADV) control system of an ADV, the actuation control system comprising:

a vehicle control system including a vehicle system controller, wherein the vehicle control system:
determines a state error between a measured state output of a vehicle system and a planning trajectory of the vehicle system, and
at the vehicle system controller, determines a control command based upon the state error and determining a first actuation command from the control command; and an actuator control system including a feedback controller, a model reference system, an adaptive gain system, and a by-wire actuation system, wherein the actuator control system:
- at the feedback controller, receives the first actuation command, an adaptive gain, and a measured actuation action and outputs a second actuation command based on the first actuation command, the adaptive gain, and the measured actuation action,
- at the model reference system, receives the first actuation command and outputs a reference actuation action,
- at the by-wire actuation system, receives the second actuation command and outputs the measured actuation action to the vehicle system,
- at a summing circuit, determines a control error between the measured actuation action and the reference actuation action, and
- at the adaptive gain system, determines the adaptive gain based upon the control error.

16. The system of claim 15, wherein the reference actuation action is based at least in part on second order attributes of the by-wire actuation system.

17. The system of claim 16, wherein the second order attributes of the by-wire actuation system include one or more of: time-latency in initiating a control action of the by-wire actuation system, a rise time, an overshoot amount, or a settling time of an actuator of the by-wire actuation system.

18. The system of claim 15, wherein the first actuation command is received at the feedback controller during a current driving cycle of the ADV and the measured actuation action was received at the feedback controller during a prior driving cycle.

19. The system of claim 15, wherein the first actuation command and the measured actuation action are received from an autonomous driving system that is configured to plan a trajectory to drive the ADV based on sensor data obtained from a plurality of sensors of the ADV in view of vehicle states obtained from a vehicle chassis of the ADV.

20. The system of claim 15, wherein the by-wire actuation system comprises at least one of a throttle control subsystem, a braking control subsystem, or a steering control subsystem.

* * * * *